Patented Nov. 24, 1931

1,833,505

UNITED STATES PATENT OFFICE

JAMES G. VAIL, OF MEDIA, PENNSYLVANIA, ASSIGNOR TO AMERICAN DOUCIL COMPANY, OF PHILADELPHIA, PENNSYLVANIA, A CORPORATION OF PENNSYLVANIA

PROCESS OF REMOVING EXCESS ALKALINITY IN SYNTHETIC BASE-EXCHANGING MATERIALS

No Drawing.   Application filed February 26, 1926.   Serial No. 90,964.

This invention relates to a process by which certain soluble alkaline compounds ordinarily produced during the manufacture of synthetic base-exchanging compounds can be adequately removed without impairment of the base-exchanging material and with a substantial decrease in the amount of time consumed in effecting the removal.

It is applicable to any synthetic, porous, base-exchanging material no matter how produced, whether by fusion or in the wet way, which contains a soluble alkaline salt such as sodium silicate or sodium hydroxide or a compound which upon hydrolysis, yields free alkali capable of reacting with a gas of acid character such as carbon dioxide gas.

In the removal of such substances leaching has ordinarily been resorted to, the product being washed with large quantities of water for long periods of time because the last residues of the objectionable compounds are only very slowly eliminated. And, at best, it often happens that slight amounts of these soluble alkaline compounds still remain when the material is put into service and if the water under treatment should lie in contact with the base-exchanging material for any length of time the soluble alkali will steadily diffuse into the relatively small quantity of water in the softener apparatus. Should the water then be withdrawn and heated the alkali may be sufficient to cause serious irritation to the skin or, where used for drinking purposes, it would have a bitter taste and might even injure the mucous membrane of the mouth.

With the foregoing in mind the following description of my invention will be better understood.

The synthetic base-exchanging material in moist condition but with all excess of moisture drained away is subjected to an atmosphere containing an acidic gas, such as carbon dioxide or sulphur dioxide. Air, of course, always contains a small percentage of carbon dioxide and it might be used without enrichment except for the large volume and great length of time that would be required. The salt which is produced by the reaction between the soluble alkali and the gas is then removed by washing, the removal being quite readily accomplished and without the expenditure of large quantities of water or long periods of time.

The process is peculiarly adapted for use in connection with a base-exchanging material made in the wet way such, for instance, as that disclosed in the Harold J. Wheaton Patent Number 1,586,764. In this patent the preferred solutions from which the material is made are sodium silicate and sodium aluminate and with such material the product of the reaction between the soluble alkali and the acid gas is sodium bicarbonate. This salt is readily removed, as stated, but even if it were not entirely removed it would have the advantage of being free from irritating characteristics when applied to the skin or bitter taste when drunk.

The process is simple and effective and in no wise injures or impairs the base-exchanging capacity of the material. In fact, the material after treatment shows a higher capacity for base-exchanging than before.

I would like to point out that base-exchanging materials are extremely porous substances and it is sometimes difficult to reach the more interior surfaces with the treating gas. Upon standing there may be, in some instances, a diffusion of alkali to the outer surfaces even after an apparently complete treatment with the gas. In such cases a second treatment may be effected and is often advisable. This can be readily accomplished, if desired, in the containers into which the material is packed by allowing the gas to flow therein and since the gas is heavier than air this may be done at small expense.

I claim:—

1. The herein described process of removing excess alkalinity in synthetic base-exchanging materials which comprises treating the moist material with a gas of acid character and subsequently washing it.

2. The herein described process of removing excess alkalinity in synthetic base-exchanging materials which comprises treating the moist material with carbon dioxide gas and subsequently washing it.

3. In the art of removing soluble alkaline compounds from synthetic base-exchanging materials that step which consists in treating the moist material with an acid gas.

4. The herein described process of removing soluble alkaline compounds from synthetic base-exchanging materials which comprises treating the moist material with an acid gas and subsequently washing it.

5. In the art of removing soluble alkaline compounds from synthetic base-exchanging materials that step which consists in treating the material with an acid gas.

In testimony whereof, I have hereunto signed my name.

JAMES G. VAIL.